United States Patent [19]

Banks et al.

[11] Patent Number: 4,828,853

[45] Date of Patent: May 9, 1989

[54] LEAVENER-CONTAINING DOUGH COMPOSITIONS BAKEABLE TO A MOIST MATRIX

[75] Inventors: Lori J. Banks, Hackensack; Robert R. Thulin, Wyckoff; Robert E. Ross, Wayne; Walter E. Schaeder, Bergenfield, all of N.J.

[73] Assignee: Nabisco Brands, Inc., Parsippany, N.J.

[21] Appl. No.: 6,254

[22] Filed: Jan. 12, 1987

Related U.S. Application Data

[63] Continuation of Ser. No. 589,419, Mar. 14, 1984, abandoned.

[51] Int. Cl.$^4$ .................... A21D 10/00; A21D 13/00; A21D 2/00
[52] U.S. Cl. .................... 426/94; 426/551; 426/552; 426/560
[58] Field of Search ............ 426/549, 551, 502, 94, 426/103, 560, 562, 552, 561

[56] References Cited

U.S. PATENT DOCUMENTS

| | | | |
|---|---|---|---|
| 2,288,118 | 6/1942 | Vaupel | 426/552 |
| 4,022,917 | 5/1977 | Selenke | 426/553 |
| 4,407,835 | 10/1983 | Chung | 426/552 |
| 4,455,333 | 6/1984 | Hong et al. | 426/94 |
| 4,503,080 | 3/1985 | Brabbs et al. | 426/94 |
| 4,650,686 | 2/1987 | Young et al. | 426/321 |

OTHER PUBLICATIONS

Pyler, E. J; *Baking Science & Technology*, vol. 2, Siebel Publishing Co, Chicago, Ill.; pp. 922–924 (1973).

Matz, S. A.; *Cookie and Cracker Technology*, AVI Publishing Co., Westport, Conn.; pp. 77–84 (1968).

Finney, K. F. et al.; "Effects of Varying Quantities of Sugar, Shortening and Ammonium Bicarbonate on the Spreading and Top Grain of Sugar-Snap Cookies", *Cereal Chemistry*, vol. 27, pp. 30–41; (1950).

*Primary Examiner*—Elizabeth C. Weimar
*Attorney, Agent, or Firm*—Richard Kornutik

[57] ABSTRACT

The invention disclosed in this application relates to leavener-containing dough compositions, methods of making such compositions and baked compositions prepared therefrom having a storage-stable soft and plastic crumb matrix. The compositions comprise a flour-based dough bakeable to a chewy texture in admixture with a heat-activated leavening agent which releases effective amounts of a leavening gas when the dough reaches the activating temperature of the leavening agent during baking. The activating temperature of the leavening agent is such that the leavener is releasing effective amounts of the leavening gas at a stage during the baking of the dough at which ingredients of the dough set-up to form the crumb matrix.

51 Claims, No Drawings

4,828,853

LEAVENER-CONTAINING DOUGH COMPOSITIONS BAKEABLE TO A MOIST MATRIX

This application is a continuation of application Ser. No. 589,419, filed Mar. 14, 1984, now abandoned.

BACKGROUND OF THE INVENTION

Cookie doughs bakeable to soft and chewy cookie products are well known to the art. Chewy cookie doughs are employed to make single dough cookies which possess a soft crumb structure, as well as to make cookies which possess more than one texture, such as cookies baked from a laminate of one or more layers of a cookie dough bakeable to a crispy texture and one or more layers of cookie dough bakeable to a chewy texture. For example, cookies which are said to mimic the outer crisp and inner soft crumb structure of a freshly baked cookie have been prepared by laminating an intermediate layer of a dough bakeable to a chewy crumb structure between outermost dough laminates which bake to a crispy texture.

Cookie doughs may be formulated to be bakeable to a chewy baked dough texture in a number of ways. For example, a cookie dough bakeable to a chewy cookie product may include as the essential ingredients of the dough: flour, water, shortening, one or more humectants, as well as effective amounts of flavorants, colorants, inclusions, etc. As described in greater detail below, the humectants in the dough function to retain moisture in the baked product so that the crumb matrix of the baked product retains the desired soft and plastic texture characteristic of chewy cookies during conventional shelf-storage periods. It follows that the moisture content bound within the crumb matrix of a chewy cookie is higher than that of a cookie having a crispy texture of comparable age. The initial moisture content of a freshly baked chewy cookie is typically above about 6% or more by weight of the baked dough, whereas the moisture content of a freshly baked cookie having a crispy texture is typically below about 5% by weight of the baked crispy dough.

During the baking of a cookie dough bakeable to a crispy texture, the gluten of the flour and any protein provided by egg or milk products in the dough rapidly begin to coagulate to a flexible and expandable state. At about the same time during the baking process, gas produced by the action of the leavening agent in the dough formulation percolates through and expands the flexible dough mass. As the baking process continues, the coagulated dough sets-up to a relatively rigid expanded condition capable of retaining the fixed impressions (cells or pores) formed by the release of the leavening gas in the dough.

When a dough bakeable to a chewy crumb structure and leavened with a conventional leavening agent is baked, the essential plasticity of the chewy crumb matrix persists after the leavening agent has been consumed. This permits the crumb matrix expanded by the action of the leavening agent to collapse under its own weight, resulting in a reduction in apparent leavening in chewy cookies.

Thus, in cross section, the crumb matrix of a leavened chewy cookie appears different from that of a comparably leavened crispy cookie. In general, moist chewy products (e.g. having above about 7% by weight moisture) leavened with conventional leaveners (e.g. baking soda and a leavening acid) tend to have a dense and compact crumb structure, with fewer cells visible in the crumb matrix and of smaller dimension than a comparably leavened cripsy cookie dough. The crumb structure of chewy cookies is often said to be "cakey."

The porosity of a leavened product refers to the number and distribution of pores of a given size within the crumb matrix. Doughs bakeable to a chewy texture have been leavened in the prior art with baking soda and a leavening acid (e.g. monocalcium phosphate). Although such soda-based leavening systems desirably produce an organoleptically acceptable pH (5.5 to 8.0), and crumb texture in the leavened product, it is desirable from a number of standpoints to enhance the porosity and apparent degree of leavening in chewy textured products over that attained in conventionally leavened chewy cookie products. By increasing the porosity of baked chewy doughs, the baked chewy product, or the chewy region in a dual-textured product, will possess a "lighter" and, therefore, improved mouth-feel. Moreover, the expansion of the chewy region in a dual-textured product due to enhanced leavening may serve to increase the physical dimension of the chewy region relative to the crispy region in a given cookie formulation and, thereby, to desirably contribute to an enhanced degree of consumer perception of "crispness and chewiness" in the cookie product.

It is an objective of this invention to provide an improved method for leavening dough formulation bakeable to plastic and moist crumb matrices, such as chewy cookie doughs or the chewy dough regions in dual-textured (e.g. crispy/chewy) baked goods.

It is also an objective of this invention to provide leavener-containing dough formulations which may be baked by conventional means to a product having a porous and storage-stable leavened crumb structure which approximates the porosity and desirably light and open appearing crumb matrix of conventionally leavened crispy dough products, while at the same time retaining the plastic and moist organoleptic properties characteristic of chewy baked products.

Other objectives of this invention include the provision of cookie dough preforms bakeable to multi-textured baked products employing the leavener-containing doughs of this invention, methods for making such dough laminates, and baked products prepared therefrom having discrete crispy regions as well as discrete chewy regions contributed by the leavener-containing doughs of the present invention.

SUMMARY OF THE INVENTION

In accordance with the foregoing, this invention provides a leavener-containing dough composition comprising a flour-based dough bakeable to a product having a storage-stable soft and plastic crumb matrix and in admixture with the flour-based dough, a heat-activated leavening agent which releases effective amounts of a leavening gas when the flour-based dough reaches the activating temperature of the leavening agent during baking, wherein the activating temperature of the leavening agent is such that the leavener is releasing effective amounts of leavening gas at the stage during the baking of the dough at which ingredients of the dough set-up to form the matrix.

In preferred embodiments of the leavener-containing dough composition of this invention, the heat-activated leavening agent is ammonium bicarbonate which releases ammonia and carbon dioxide as the leavening gases when dough temperatures of about 140° F. are reached during baking. In further embodiments of this invention, the leavening system employed in the dough bakeable to a chewy crumb texture comprises ammonium bicarbonate as a heat-activated leavening agent as well as sodium bicarbonate which is chemically activated by the presence of a leavening acid in solution in the aqueous phase of the dough composition.

This invention also provides a cookie dough preform bakeable to a leavened cookie having at least one storage-stable crispy textured region and at least one storage-stable chewy textured region, comprising at least one discrete portion of a leavener-containing cookie dough bakeable to a crispy crumb texture in combination with at least one discrete portion of a cookie dough bakeable to a chewy crumb matrix. The dough bakeable to a chewy crumb matrix is comprised of a flour-based dough in admixture with a heat-activated leavening agent which releases an effective amount of a leavening gas when the dough reaches the activating temperature of the leavening agent during baking, wherein the activating temperature of the leavening agent is such that the leavening agent is releasing effective amounts of leavening gas at the stage during baking at which ingredients of the dough set-up to form the chewy crumb matrix.

This invention also provides methods for making the above-described leavener-containing dough compositions and cookie preform, as well as leavened cookie products having a porous chewy crumb matrix prepared by baking the leavener-containing dough compositions of this invention.

DETAILED DESCRIPTION OF THE INVENTION

Dough formulations bakeable to a chewy organoleptic texture, and characterized by a moist and plastic crumb texture are well known to the art. Through the use of the heat-activated leavening system of this invention, a leavened chewy baked product is provided which possesses a porous crumb structure which approximates the porosity of a dough formulated to be bakeable to a crispy product. Moreover, despite the inherent plasticity of chewy dough products, the crumb matrix of products baked from the leavened dough of this invention is structurally stable, and does not collapse to any noticeable extent even after storage at room temperature for extended time periods (e.g. 4–6 months.

The heat-activated leavener component of this invention may be employed in any cookie dough formulation which due to high moisture, shortening composition, or the presence of humectants or other ingredients, is bakeable to a shelf-stable chewy textured product. As described in greater detail below, cookie doughs bakeable to a shelf-stable chewy product may be comprised of flour, water, shortening and a humectant as the basic dough ingredients, plus other conventional ingredients such as egg, milk, flavorants, inclusions, colorants, texturizers, etc. The dough is baked by conventional means to a moisture content of at least about 6% by baked product weight. For example, the baked dough may include from about 6% to about 16% moisture, and preferably from about 7% to about 10% moisture. The baked product preferably possesses a water activity of less than about 0.7, and most preferably less than about 0.6 in order to assure the attainment of microbial stability for prolonged periods (preferably about 4–6 months) of storage at room temperature.

Heat-activated leavening agents useful herein are dough leaveners which generate substantially all (i.e., at least about 70% to about 100%) of their leavening gas when the baking cookie product reaches an internal dough temperature of at least about 125° F. Preferably the heat-activated leavening agent releases substantially all of its leavening gas when the internal temperature of the baking dough reaches a temperature of from about 125° F. to about 150° F., and most preferably about 130° F. to about 145° F. Heat-activated leavening agents include fat-encapsulated leaveners (e.g., encapsulated sodium bicarbonate leaveners), and, preferably, ammonium bicarbonate.

Ammonium bicarbonate volatilizes and disassociates into ammonia gas and acetonedicarboxylic acid ($HOOCCH_2COCH_2COOH$) at a temperature of about 140° F. The acetonedicarboxylic acid by-product of the decomposition of ammonium bicarbonate in turn rapidly decomposes to carbon dioxide plus acetone when exposed to baking temperatures. At room temperature ammonium bicarbonate is a white crystalline, stable material. Preferably, the ammonium bicarbonate is dissolved in water at ambient temperature and added into the dough formulation in aqueous solution.

Despite the relatively high moisture content of the baked chewy cookie doughs described herein (i.e., about 6% or above by weight moisture) the gaseous by-products formed during decomposition of the ammonium bicarbonate are baked out of the dough during baking, leaving no undesirable ammonia aftertaste in the baked product. Moreover, the final pH of the baked cookie dough is unaffected by the decomposition of the ammonium bicarbonate which is deemed to be a further indication that ammonia is not retained in the finished product.

During the baking of a dough bakeable to a plastic and moist texture, a point is reached during baking when the gluten in the flour, and any of the protein provided by other ingredients of the dough (e.g. egg products, milk, etc.) set to the desired plastic state. Unlike doughs which set to a rigid (crisp) crumb structure, the retained plasticity in a chewy dough permits the crumb matrix to settle after the action of the leavener has ceased, undesirably reducing the number and size of the pores in the plastic crumb matrix. Thus, in order to enhance the leavening of a baked product having a moist and plastic crumb matrix, it is desirable to employ a leavening agent which reaches a point of optimal leavening gas generation, and is functioning to forceably expand the baking dough mass, at the point in time at which the crumb matrix sets to the state at which it is most capable of retaining the pores produced by the action of the leavening gas.

Conventional soda-based leavening systems begin to generate leavening gas (carbon dioxide) upon solution in the aqueous phase of the dough even at room temperature. Moreover, the rate of gas generation from such leaveners increases continuously and rapidly with the increase in dough temperature during baking. Thus, unlike the heat-activated leaveners employed herein, the point of maximal leavening gas generation by soda-based leavening agents cannot be readily adjusted to a desired internal dough temperature. While not intending to be bound by theory, it is believed that the enhanced leavening of plastic/moist crumb matrices attained through the use of the heat-activated leavening agent of this invention, as compared to soda-based leaveners, is attributable to the activation of the heat-activated leavener at internal dough temperatures of at least about 125° F. to about 150° F., which in turn aids in synchronizing maximal leavener activity with the temperatures attained in the dough mass at which due to gluten and, optionally, protein coagulation, the dough has reached a consistency capable of retaining a leavened and porous structure.

In comparison to crispy doughs, doughs bakeable to a chewy crumb texture typically have a higher initial moisture content. In the process of reaching the activating temperature of the leavener during baking, the moisture content of a dough bakeable to a chewy texture (now partially baked) is lower than the initial moisture content of the dough. The leavening gas, therefore, has less weight of moist dough to press against to form cells when it is heat-activated during baking. Thus, the activation of the leavener, during baking and after the moisture content of the dough is reduced, is deemed to have a beneficial effect on cell formation by the leavener.

The heat-activated leavening agent may be employed in the dough in amounts necessary to provide the desired degree of leavening (porosity) in the baked chewy cookie dough. In general, however, from about 1 to 48 ounces, preferably about 4 to 18 ounces of the heat-activated leavening agent may be employed, per 100 pounds of flour employed in the cookie dough.

The heat-activated leavening agent may be the sole leavening component of the dough, although other secondary leavening agents may be advantageously employed in combination with the heat-activated leavening component. Suitable secondary leavening agents for use herein are the chemically-activated leavening agents such as mixtures of sodium bicarbonate and a leavening acid which begin producing carbon dioxide leavening gas as the result of a chemical reaction which occurs in solution in the aqueous phase of the dough.

A large number of such leavening acids suitable for use in combination with sodium bicarbonate are known to the art. Representative classes of leavening acids useful herein include the calcium phosphates, sodium acid pyrophosphates and sodium aluminum phosphates. Representative commercially available leavening agents within the foregoing classes include: crude monocalcium phosphate monohydrate, anhydrous coated monocalcium phosphate, dicalcium phosphate dihydrate, acidic sodium aluminum phosphate, sodium aluminum phosphate (acidic) with anhydrous aluminum sulfate, and sodium aluminum phosphate (acidic) with anhydrous coated monocalcium phosphate.

The leavening reaction of the sodium bicarbonate and a leavening acid is initiated upon co-solution in water at room temperature, and completed during baking. Sodium bicarbonate rapidly dissolves in water and, hence, the rate at which the leavening gas (i.e. $CO_2$) is produced will depend upon the relative rate at which the leavening acid selected for use will dissolve in the water present in the dough. The preferred leavening acid for use herein is one which at conventional baking temperatures is capable of releasing at least about 50% of its leavening gas during baking, assuming that baking has been initiated about 15 minutes after all of the ingredients of the dough have been mixed, and the dough prior to baking has been stored at room temperature. Leavening agents of this type include the sodium acid pyrophosphates. Several grades of sodium acid pyrophosphate are commercially available and differ in terms of the rate at which they react with sodium bicarbonate to release carbon dioxide as a leavening gas. Commercially available sodium acid pyrophosphates include SAPP-RD-1, SAPP26, SAPP28, SAPP37, SAPP40 and SAPP43, commercially available from Monsanto Co., Kenilworth, NJ.

The chewy cookies baked from the doughs of this invention preferably have a final pH of about 5.5 to about 8.0, and preferably about 7.0 to about 7.5. As mentioned above, ammonium bicarbonate does not alter the pH of the baked product. Therefore, when the heat-activated leavening agent employed is ammonium bicarbonate, a conventional pH-adjusting dough additive may be included in the dough formulation so that the final pH of the baked product will fall within the desired pH range. However, it is preferred to select a secondary leavener for use in the dough which, in combination with the other ingredients of the dough, is productive of baked products having a pH of about 5.5 to about 8.0. A preferred secondary leavening system is sodium bicarbonate and sodium acid pyrophosphate employed in amounts productive of a baked product within the desired pH range.

The heat-activated leavener and optional secondary leavener may be employed in any cookie dough formulation which is bakeable to a storage stable soft and plastic crumb matrix characteristic of chewy baked goods. For example, a leavenable dough bakeable to a shelf-stable chewy texture may include as its basic ingredients flour, water, shortening, a humectant, the heat-stable leavening agent, as well as other conventional cookie dough ingredients such as milk products, egg products, flavorants, inclusions, etc.

Humectant-containing cookies employing the leavening system of this invention retain, for prolonged periods, the moistness and crumb plasticity characteristic of chewy baked products. When a cookie dough formulation does not contain a humectant or other formula modification intended to impart chewiness to the baked product but, for example, contains sucrose as the sole sweetening agent (e.g., the conventional sugar cookie), upon the completion of the baking process and cooling of the cookie to room temperature, sucrose soon begins to crystallize from pockets of saturated sucrose solution held within the crumb matrix. As the sucrose crystallizes, free moisture is lost from the cookie to the surrounding environment even when the cookie is stored in a closed container. Within about two weeks and often less, the loss of moisture from the cookie leads to a crispy texture throughout, even where the initial post-baking moisture content of the cookie was 6% or more.

It is well known that when humectants are added to a cookie dough, the product baked from such a dough will possess a plastic, moist and non-hardening crumb structure, which will be retained during storage in conventional packaging for greater than 2 weeks, and even up to periods of many months. The heat-activated leavener described herein is advantageously employed in such chewy cookie products.

A wide variety of food-compatible humectants may be employed in the leavener-containing doughs of this invention. The humectants employed herein include sugar and/or non-sugar ingredients which bind moisture in a baked dough in the sense that the equilibrium rate of moisture loss from the baked product to the environment due to the presence of the humectant is slowed to such a degree that a baked product containing the humectant, and having an initial moisture content of at least about 6%, retains a soft and pliable crumb texture for at least about 2 months, and preferably for at least about 4-6 months when the cookie is stored in a closed container Sugar humectants are preferred because they may also impart a desired degree of sweetness to the baked product, when such sugars are employed alone or in combination with a non-humectant sugar (such as sucrose). Suitable humectant sugars include fructose, dextrose, corn syrups, invert syrups, high fructose corn syrups, honey, molasses, as well as mixtures of one or more of the foregoing humectants with sucrose. For example, a suitable humectant sugar composition for use in the leavener-containing doughs of this invention may be comprised of about 0 to 85% sucrose, with the balance of the sugar being comprised of fructose, and/or dextrose employed in the form of the crystalline sugar, or in the alternative the balance of the sugar may be provided by the sugar solids content of a corn syrup, honey, or a high fructose corn syrup, or another humectant sugar. Commercially available high fructose corn syrups are prepared by the enzymatic isomerization of dextrose containing corn syrups, and typically possess a sugar solids component of about 40% to about 100% by weight fructose, with the balance of the non-fructose sugar solids being primarily dextrose plus minor amounts of other monosaccharides. The sugar solids content of commercially available high fructose corn syrups typically ranges from about 70% to 73%, up to about 82% by weight. Examples of other humectant sugars include maltose, sorbose, mannose, lactose, galactose, etc. It is preferred that when sucrose is employed in the dough that the humectant sugar comprise at least about 15%, and most preferably at least about 20% by weight of the total sugar content of the dough.

In addition to the sugar humectants, a wide variety of humectants which are not sugars or possess a low degree of sweetness relative to sucrose may also be employed in the leavenable doughs of this invention. For example, the use of glycerol, sorbitol and other polyols as humectants is well known in the art, e.g. sugar alcohols such as mannitol, maltitol, xylitol, sorbitol. Additional examples of humectant polyols (e.g. polyhydricalcohols) include humectant glycols, hydrogenated glucose sugars, sugar esters, dextrins, and other starch hydrolyzation products. When sucrose is employed in combination with one or more of the foregoing humectants, the humectant preferably comprises at least about 15%, and preferably at least about 20% by weight of the humectant and sucrose combination.

The humectant may be included in the dough as an added ingredient, or an enzyme may be included in the dough formulation which acts on a substrate also included in the dough during, before or after baking, to produce effective amounts of the humectant in situ in the dough. Examples of suitable enzymes for this purpose include invertase which effects the inversion of sucrose to invert sugar, as well as other glycosidases and polysaccharidases which after acting on carbohydrates present in the dough produce humectants as the by-products of their enzymatic activity.

Enzymes suitable for use herein include polysaccharidases which act upon farinaceous materials to produce lower molecular weight saccharides such as glucose, maltose, modified starches, dextrins, etc. Enzymes of this type include alpha- and beta-amylases. Alpha-amylases, such as those obtained from bacterial sources (*B. subtilis* or *B. mesintericus*) are known to be quite heat stable, and have been reported to be able to retain some activity at temperatures as high as 100° C. The number of SKB units of amylase enzyme per 100 grams of flour will typically be about 6 to 1000 SKB units. Pregelatinized starch may be added to the dough to provide a readily available substrate for the enzyme. SKB units may be assayed by the method of Sandstedt, Kneen and Blish, given in Cereal Chemistry, Vol. 16, p. 712 (1939). Amylase enzymes are commercially available, and include Fresh-N, a product of G.B. Fermentation Industries, Inc., Charlotte, N.C., as well as Termamyl and Bacterial Amylase Novo (Ban) which are products of Novo Industries A/S, Novo Alle, DK-2880, Bagsvaerd, Denmark.

The flour and shortening employed in the leavenable dough of this invention are selected from conventional ingredient lines. The flour component may be any comminuted cereal grain or edible seed meal such as wheat flour, corn flour, corn starch, modified starch, rice flour, potato flour, barley flour, or the like. The shortening may be any edible fat or oil or mixtures thereof suitable for baking applications, and may further include conventional food-grade emulsifiers.

The amount of flour, water, shortening and humectant employed in the leavenable doughs of this invention may vary over a wide range depending upon the properties of the end product desired, and the processing steps employed. In general, however, on the basis of 100 pounds of the flour component of the dough, the humectant plus any sucrose or other sweetener employed (e.g. artificial sweeteners) in the formulation may be present in amounts ranging from about 25 to about 150 pounds depending on the degree of sweetness and humectant properties desired in the baked product. The shortening may be present in amounts ranging from about 20 to about 80 pounds per 100 pounds of flour.

The initial moisture content of the dough is adjusted to provide the desired consistency to the dough to enable proper working and shaping of the dough. The total moisture content of the dough will include any water included as a separately added ingredient, as well as the moisture provided by flour which usually contains 12% to 14% by weight moisture, and the moisture content of other dough additives which may be included in the formulation such as high fructose corn syrup or invert syrups. Taking into account all sources of moisture in the dough, including separately added water, the total initial moisture content of the dough may range from about 20% to about 60% by weight of the dough formulation.

In addition to the foregoing, the dough may include other additives conventionally employed in cookie products including, for example, milk products or by-products, egg products or by-products, cocoa, vanilla, cereal (oatmeal), as well as inclusions such as nuts, chocolate chips, raisins, coconut, etc. Moreover, the leavenable doughs of this invention may be used to bake a drop cookie, or employed as the base cake for a filled cookie (e.g. Fig Newton) or a sandwich-type cookie.

The leavenable doughs of this invention may be cut, or otherwise shaped in a conventional manner. As mentioned above, the time and temperature of baking are adjusted in accordance with conventional techniques to provide a moisture content in the baked product of 6% or above. While baking time and temperatures will vary for different dough formulations, oven type, etc., in general, commercial cookie baking times may range from about 5 minutes to 15 minutes, and baking temperatures for cookie products may range from about 250° F. to about 500° F. Of course, the use of the higher baking temperatures requires less baking time. Preferably, however, baking conditions are controlled so that the dough will not reach the activating temperature of the leavening agent for about 1 to about 3 minutes, and preferably for about 1 to about 2 minutes after the baking process has begun.

In further embodiments of this invention, the leavenable dough described above is combined with a cookie dough bakeable to a crispy texture to provide a cookie dough preform bakeable to a product having discrete chewy textured regions and discrete crispy textured regions, attributable to the different doughs employed to make the preform.

The dough employed for its crispy texture can be a conventional sucrose-containing dough comprised of flour, water, shortening and a sugar component comprised of above about 85% by weight sucrose. Of course, an amount of one or more of the humectant materials described above may also be included in the dough bakeable to a crispy texture so long as the humectant will not bind water or inhibit sucrose crystallization to a degree that it undesirably detracts from the desired crispy texture in the baked product.

A suitable cookie dough bakeable to a crispy texture may comprise based on 100 pounds of flour, from about 25 to 150 pounds of granulated sucrose, from about 20 to about 80 pounds of shortening, and from about 0 to 5 pounds of a conventional leavening system. The dough bakeable to a crispy texture is one which is adequately leavened by conventional leavening ingredients, although, if desired, the heat-activated leaveners described above may be included in both the chewy and the crispy dough portions of the cookie. The dough bakeable to a crispy texture will also contain water in an amount sufficient to provide the desired consistency to the dough to enable proper working and dough shaping. The conventional dough additives discussed above with reference to chewy doughs may also be included in conventional amounts in the dough formulation bakeable to a crispy texture.

The leavenable dough bakeable to a chewy region may be combined with the dough bakeable to a crispy texture in a number of different ways. For example, in order to mimic the crispy/chewy textural dichotomy of a freshly baked cookie, the chewy dough may be present as an intermediate layer (or encased) between two crispy dough layers. Alternatively, a layer of dough bakeable to a chewy texture may be formed into a sandwich cookie with a water- or fat-based filling, placed upon a layer of crispy dough, the laminate rolled, and then sliced, to provide pinwheel cookies having discrete chewy and crispy regions, or subsequently treated in some other manner to form novel products.

By adjusting the amount of dough employed to provide chewy regions relative to the amount of dough productive of crispy regions, the desired degree of textural dichotomy is attained in the baked product. For cookie products having a crispy-chewy textural dichotomy which approximates that of a home-baked cookie, it is preferred to employ about equal weights of dough productive of the chewy and crispy textured regions in the finished product.

After equilibrium of the moisture present in the freshly baked two-dough cookie, the result is a crispy texture due to the loss of moisture and associated crystallization of sucrose in the dough bakeable to a crispy product, while moistness and chewiness are retained in the humectant-containing baked chewy dough. The use of a heat-activated leavening agent advantageously produces a baked chewy region with a porous crumb structure, which approximates the porosity and apparent degree of leavening present in the crispy baked dough. The enhanced leavening produced by the action of the heat-activated leavening agent in the baked chewy dough improves the mouth-feel of the chewy product, relative to densely packed chewy doughs which are not leavened in accordance with this invention. Moreover, when the leavened chewy cookie dough described herein is employed, in cross section there is an enhanced degree of uniformity in crumb appearance between the crispy/chewy laminated dough regions.

As employed in the context of the present invention, the term "chewy" is intended to define textures which possess a discernible degree of plasticity. Chewiness also connotes impressions of softness and moistness. Crispness and chewiness can be described in terms of taste panel tests which take as standards the texture of fresh saltine crackers having a moisture content of about 2% (rating of 0) and a freshly baked cookie having a distinctly chewy texture throughout (rating of 10): i.e., chewy cookies prepared in accordance with the following recipe:

| | |
|---|---|
| ⅔ c. | sugar |
| ¼ c. | butter or regular margarine |
| 1 tsp. | ground ginger |
| ½ tsp. | ground cinnamon |
| ½ tsp. | baking soda |
| ½ tsp. | salt |
| ½ tsp. | vanilla |
| 1 | egg |
| ½ c. | honey |
| 1¼ c. | sifted flour |

The cookies are prepared by combining ⅔ cup of sugar, butter, ginger, cinnamon, baking soda, salt and vanilla in a large mixing bowl and creaming the ingredients until they are light and fluffy. Next the eggs are added and beat in until the mixture is blended. The honey is then blended in, followed by the blending in of the flour a little at a time. The dough is dropped by teaspoonfuls 2½ inches apart onto a lightly greased baking sheet, baked at 350° F. for 10 to 15 minutes until lightly browned and removed at once from the baking sheet to racks to cool thoroughly.

The invention will be described further with reference to the following examples.

EXAMPLE 1

A leavenable dough bakeable to a chewy texture is prepared from the following ingredients:

| Ingredient | Amount (Pounds) |
|---|---|
| flour | 100 |
| granulated sugar | 40 |
| high-fructose corn syrup | 10 |
| vegetable shortening | 30 |
| baking powder | 1.5 |
| ammonium bicarbonate | 1 |
| water | 10 |

The dough is prepared by mixing together the granulated sugar and shortening until a smooth consistency is obtained. Next the corn syrup, water, ammonium bicarbonate (in aqueous solution) are added and mixed until well blended. As the last step, the baking powder and the flour are added to the above and mixed. The dough is cooled to refrigerator temperature to improve workability, and the dough is cut or otherwise shaped into cookie preforms (each weighing about 0.5 ounces). The cookie is baked for about 6-8 minutes at a temperature of about 400° F. to provide a final moisture content in the baked cookie of above about 7 weight percent.

EXAMPLE 2

A dual-textured cookie is prepared by wrapping an inner ball of the dough bakeable to a chewy texture described in Example 1 in a blanket of a cookie dough bakeable to a crispy texture. The weight of the inner ball of dough is about equal to the weight of the outer crispy dough. The dough portion bakeable to a crispy texture is prepared from the following ingredients:

| Ingredient | Amount (Pounds) |
|---|---|
| flour | 100 |
| granulated sugar | 50 |
| hydrogenated vegetable shortening | 30 |
| baking powder | 1.5 |
| water | 10 |

The dough bakeable to a crispy texture is prepared by first mixing the granulated sugar and shortening until a smooth consistency is obtained. Next, the water and ammonium bicarbonate (in aqueous solution in a portion of the water) are added to the foregoing and mixed. As the last step, the flour and baking powder are blended with the other ingredients. The above-described laminated cookie preform is then prepared, and the composite dough is baked to an end point moisture content of above about 7.0%, and cooled at room temperature. The cookie is stored in a closed container at room temperature until the moisture in the cookie has equilibrated between the crispy and chewy regions of the cookie. The outer dough portion has a leavened appearance and a crispy texture. The inner dough portion possesses a soft and plastic crumb matrix having a distinctly leavened appearance, including visually apparent cells formed by the action of the leavening components.

EXAMPLE 3

A chewy chocolate chip cookie is prepared from the following dough ingredients:

| Ingredients | Amount (pounds-ounces) |
|---|---|
| Flour | 100-0 |
| chocolate chips | as desired |
| sucrose | 25-0 |
| shortening | 38-0 |
| *humectant | 100-0 |
| milk powder | 4-0 |
| sodium bicarbonate | 0-12 |
| sodium acid pyrophosphate | 0-5 |
| modified corn starch | 8-8 |
| eggs | 5-8 |
| flavorants and other minor ingredients | 1-8 |
| ammonium bicarbonate | 1-2 |

-continued

| Ingredients | Amount (pounds-ounces) |
|---|---|
| water | 13-0 |

*The humectant is a flavorful blend of high fructose corn syrup, honey and molasses.

The chewy cookie dough is prepared by first mixing in an upright mixer at a slow speed the sucrose, shortening, modified starch, milk powder, eggs and flavorants for three minutes at a slow mixing speed. Next, the humectants and the water (containing dissolved ammonium bicarbonate) are mixed for three minutes. This is followed by the addition with mixing of the flour, sodium bicarbonate and sodium acid pyrophosphate for about two to three minutes. As a final step, the chocolate chips are blended into the dough at slow speed.

The dough is shaped into a cookie preform and baked in a band oven at a temperature of about 150° to 500° F. for about 7 to 10 minutes to an end point moisture content of about 7.0%, in the following manner:

| Oven Zone | Approx. Product Temperature °F. | Approx. Baking Time in Zone |
|---|---|---|
| 1 | 75-110 | 1.0-1.4 |
| 2 | 110-145 | 1.0-1.4 |
| 3 | 145-200 | 1.0-1.4 |
| 4 | 200-210 | 1.0-1.4 |
| 5 | 210-225 | 1.0-1.4 |
| 6 | 225-210 | 1.0-1.4 |
| 7 | 210-195 | 1.0-1.4 |

While the present invention has been particularly described in terms of specific embodiments thereof, it will be understood that numerous variations within the spirit and scope of the invention will be apparent to those of ordinary skill in the art, which variations reside within the scope of the present invention.

What is claimed is:

1. A leavener-containing dough composition bakeable to a moist and plastic crumb matrix comprising a flour-based dough including an amount of a humectant effective to render said flour-based dough bakeable to a product having a moisture content of at least about 6% by weight and a storage-stable soft, moist and plastic crumb matrix, and in admixture with the flour-based dough, a heat-activated leavening agent which releases at least about 70% of its leavening gas when the flour-based dough reaches the activating temperature of the leavening agent during baking, wherein the activating temperature of said leavening agent is such that said leavener releases at least about 70% of its leavening gas at the stage during the baking of said dough at which the plastic crumb matrix of said dough is capable of retaining a leavened and porous structure due to action of the heat-activated leavening agent.

2. The dough composition of claim 1 wherein the flour-based dough is a sweetened cookie dough which includes flour, water, humectant, shortening, and flavoring, the activating temperature of said leavening agent is from about 125° F. to about 150° F.; and wherein the dough composition is bakeable to a soft cookie product having a water activity of below about 0.7.

3. The dough composition according to claim 1 wherein the heat-activated leavening agent is ammonium bicarbonate.

4. The dough composition according to claim 2 wherein the flour-based dough is a sweetened cookie dough which includes in combination with the heat-activated leavening agent a leavening agent comprised of sodium bicarbonate and a leavening acid, and when the dough is baked the pH of the baked product is about 5.5 to about 8.0.

5. The dough composition according to claim 1 wherein the humectant is a humectant sugar selected from the group consisting of fructose, dextrose, corn syrup, high fructose corn syrup, honey, molasses and invert syrup.

6. The dough composition according to claim 1 wherein the humectant is selected from the group consisting of food compatible humectant polyols and humectant starch hydrolyzation products.

7. The dough composition according to claim 5 wherein the dough includes sucrose, and wherein the humectant sugar comprises at least about 20% by weight of the total sugar component of the dough, and wherein said heat-activated leavening agent is ammonium bicarbonate.

8. The dough composition according to claim 6 wherein the dough further includes sucrose and wherein the humectant comprises at least about 20% by weight of the total weight of humectant and sucrose in said dough; and wherein said heat-activated leavening agent is ammonium bicarbonate.

9. The dough composition according to claim 7 wherein the heat-activated leavening agent comprises from about 1 to about 48 ounces of the leavening agent per 100 pounds of flour in said dough.

10. The dough composition according to claim 8 wherein the heat-activated leavening agent comprises about 1 to about 48 ounces per 100 pounds of flour in said dough.

11. A cookie dough preform bakeable to a leavened cookie having at least one storage-stable region having a rigid crumb and at least one storage-stable region having a soft or plastic crumb, comprising at least one discrete portion of a leavener-containing cookie dough bakeable to a rigid crumb texture in combination with at least one discrete portion of a cookie dough bakeable to a soft or plastic crumb matrix having a porosity approximating that of the rigid crumb; wherein the dough bakeable to the soft or plastic crumb matrix is comprised of a flour-based dough including an amount of a humectant effective to render said flour-based dough bakeable to a product having a moisture content of at least about 6% by weight and a storage-stable soft, moist and plastic crumb matrix, in admixture with a heat-activated ammonium bicarbonate leavening agent which releases at least about 70% of its leavening gas at the stage during baking at which said dough bakeable to the soft or plastic crumb matrix is capable of maintaining porosity imparted by the leavening agent.

12. The cookie dough preform according to claim 11 wherein said dough bakeable to a soft or plastic crumb matrix is a cookie dough comprised of flour, water, humectant, shortening and sucrose; and wherein said cookie preform is bakeable to a product having water activity of below about 0.7.

13. The cookie dough preform according to claim 12 wherein said flour-based dough bakeable to a soft or plastic crumb matrix includes in combination with the heat-activated ammonium bicarbonate leavening agent, a leavening agent comprised of sodium bicarbonate and a leavening acid, and when the dough is baked the pH of the baked product is about 5.5 to about 8.0.

14. The cookie dough preform according to claim 11 wherein the humectant is a humectant sugar selected from the group consisting of fructose, dextrose, corn syrup, high fructose corn syrup, honey, molasses and invert syrup.

15. The cookie dough preform according the claim 11 wherein humectant is selected from the group consisting of food compatible humectant polyols and humectant starch hydrolyzation products.

16. The cookie dough preform according to claim 14 wherein said flour-based cookie dough includes sucrose, the humectant sugar comprises at least about 20% by weight of the total sugar component of the dough, said dough bakeable to a rigid crumb texture includes an amount of a leavener comprised of sodium bicarbonate and a leavening acid effective to provide a leavened crumb structure in said baked rigid dough portion; and wherein the weight ratio of dough bakeable to the soft or plastic crumb matrix relative to dough bakeable to the rigid crumb texture is about 1:1.

17. The cookie dough preform according to claim 15 wherein said flour-based cookie dough includes sucrose, the humectant comprises at least about 20% by weight of the total weight of the humectant and sucrose in said dough; and wherein the weight ratio of dough bakeable to the rigid crumb texture to dough bakeable to the soft or plastic crumb matrix is about 1:1.

18. The dough composition according to claim 16 wherein the heat-activated leavening agent comprises from about 1 to about 48 ounces of the leavening agent per 100 pounds of flour in said flour-based dough.

19. The dough composition according to claim 17 wherein the heat-activated leavening agent comprises about 1 to about 48 ounces per 100 pounds of flour in said flour-based dough.

20. A leavened baked product prepared by baking a leavener-containing dough composition comprising a flour-based dough including an amount of humectant effective to render said flour-based dough bakeable to a product having a moisture content of at least about 6% by weight and a storage-stable soft, moist and plastic crumb matrix, and in admixture with said flour-based dough, a heat-activated leavening agent which releases at least about 70% of its leavening gas when the dough reaches the activating temperature of the leavening agent during baking, wherein the activating temperature of said leavening agent is such that said leavener releases at least about 70% of its leavening gas at the stage during the baking of said dough at which the plastic crumb matrix of said dough is capable of retaining a leavened and porous structure due to action of the heat-activated leavening agent.

21. The baked product of claim 20 wherein the flour-based dough is a sweetened cookie dough which includes flour, water, humectant, shortening, and flavoring; the activating temperature of said leavening agent is from about 125° F. to about 150° F.; and wherein the baked product has a water activity of below 0.7.

22. The baked product according to claim 21 wherein the heat-activated leavening agent is ammonium bicarbonate.

23. The baked product according to claim 21 or claim 22 wherein the flour-based dough is a sweetened cookie dough which includes in combination with the heat-activated leavening agent, a leavening agent comprised of sodium bicarbonate and a leavening acid, and wherein the pH of the baked product is about 5.5 to about 8.0.

24. The baked product according to claim 23 wherein the humectant is a sugar selected from the group consisting of fructose, dextrose, corn syrup, high fructose corn syrup, honey, molasses and invert sugar.

25. The baked product according to claim 23 wherein the humectant is selected from the group consisting of food compatible humectant polyols and humectant starch hydrolyzation products.

26. The baked product according to claim 24 wherein the dough includes sucrose, and wherein the humectant sugar comprises at least about 20% by weight of the total sugar component of the dough, and wherein said heat-activated leavening agent is ammonium bicarbonate.

27. The baked product according to claim 25 wherein the dough further includes sucrose and wherein the humectant comprises at least about 20% by weight of the total weight of humectant and sucrose in said dough; and wherein said heat-activated leavening agent is ammonium bicarbonate.

28. The baked product according to claim 26 wherein the heat-activated leavening agent comprises from about 1 to about 48 ounces of the leavening agent per 100 pounds of flour in said dough.

29. The baked product according to claim 27 wherein the heat-activated leavening agent comprises about 1 to about 48 ounces per 100 pounds of flour in said dough.

30. A cookie having at least one storage-stable region having a rigid crumb and at least one storage-stable region having a soft or plastic crumb, prepared by baking a cookie dough preform comprising at least one discrete portion of a cookie dough bakeable to a soft or plastic crumb matrix, having a porosity approximating that of the rigid crumb, in combination with at least one portion of a cookie dough bakeable to a rigid crumb matrix; wherein the dough bakeable to a soft or plastic crumb matrix is comprised of a flour-based dough including an amount of humectant effective to render said flour-based dough bakeable to a product having a moisture content of at least about 6% by weight and a storage-stable soft, moist and plastic crumb matrix, in admixture with a heat-activated ammonium bicarbonate leavening agent which releases at least about 70% of its leavening gas at the stage during baking of said dough at which said dough bakeable to the soft or plastic crumb matrix is capable of maintaining porosity imparted by the leavening agent.

31. The baked cookie according to claim 30 wherein said dough bakeable to a soft or plastic crumb matrix is a leavener-containing sweetened cookie dough comprised of flour, water, humectant, shortening and sucrose; and wherein said baked cookie has a water activity of below about 0.7.

32. The baked cookie according to claim 31 wherein the flour-based dough bakeable to a soft or plastic crumb matrix is a sweetened cookie dough which includes in combination with the heat-activated ammonium bicarbonate leavening agent, a leavening agent comprised of sodium bicarbonate and a leavening acid, and when the dough is baked the pH of the baked product is about 5.5 to about 8.0.

33. The baked cookie according to claim 32 wherein the humectant is a sugar selected from the group consisting of fructose, dextrose, corn syrup, high fructose corn syrup, honey, molasses and invert syrup.

34. The baked cookie according to claim 32 wherein the humectant is selected from the group consisting of food compatible humectant polyols and humectant starch hydrolyzation products.

35. The baked cookie according to claim 33 wherein said flour-based dough bakeable to a soft or plastic crumb matrix includes sucrose, and the humectant sugar comprises at least about 20% by weight of the total sugar component of the dough.

36. The baked cookie according to claim 34 wherein said flour-based dough bakeable to a soft or plastic crumb matrix includes sucrose, and wherein the humectant comprises at least about 20% by weight of the total weight of humectant and sucrose in said dough.

37. The baked cookie according to claim 35 wherein the heat-activated leavening agent comprises from about 1 to about 48 ounces of the leavening agent per 100 pounds of flour in the flour-based dough.

38. The baked cookie according to claim 36 wherein the heat-activated leavening agent comprises about 1 to about 48 ounces per 100 pounds of flour in said flour-based dough.

39. The baked cookie according to claim 35 wherein said cookie preform is comprised of an intermediate layer of said dough portion bakeable to a soft or plastic crumb matrix disposed between two outer layers of said dough bakeable to a rigid crumb matrix, and wherein the weight ratio of dough bakeable to a soft or plastic crumb matrix relative to dough bakeable to a rigid crumb matrix is about 1:1.

40. The baked cookie according to claim 36 wherein said cookie preform is comprised of an intermediate layer of said dough portion bakeable to a soft or plastic crumb matrix disposed between two outer layers of said dough bakeable to a rigid crumb matrix and wherein the weight ratio of dough bakeable to the soft or plastic crumb matrix relative to dough bakeable to the rigid crumb matrix is about 1:1.

41. A method for preparing a dough bakeable to a leavened cookie product which comprises mixing together a flour-based dough including an amount of humectant effective to render said flour-based dough bakeable to a soft and plastic crumb matrix having a moisture content of at least about 6% by weight, and a heat-activated leavening agent which releases at least about 70% of its leavening gas when the dough reaches the activating temperature of the leavening agent during baking, wherein the activating temperature of said leavening agent is such that said leavener releases at least about 70% of its leavening gas at a stage during baking of said dough at which the plastic matrix of said dough is capable of retaining a leavened and porous structure due to action of the heat-activated leavening agent.

42. The method of claim 41 wherein the flour-based dough is a sweetened cookie dough which includes flour, water, humectant, shortening, and flavoring; the activating temperature of said leavening agent is from about 125° F. to about 150° F.; and wherein said dough is bakeable to a product having a water activity of below about 0.7.

43. The method according to claim 41 wherein the heat-activated leavening agent is ammonium bicarbonate.

44. The method according to claim 42 or 43 comprising mixing together said flour-based dough, said heat-activated leavening agent and a leavening agent comprised of sodium bicarbonate and a leavening acid; and when the dough is baked, the pH of the baked product is about 5.5 to about 8.0.

45. The method according to claim 42 wherein the humectant is a sugar selected from the group consisting of fructose, dextrose, corn syrup, high fructose corn syrup, honey, molasses and invert syrup.

46. The method according to claim 42 wherein the humectant is selected from the group consisting of food compatible humectant polyols and humectant starch hydrolyzation products.

47. A method for preparing a cookie dough preform bakeable to a cookie having at least one storage-stable region having a rigid crumb and at least one storage-stable region having a soft or plastic crumb in the baked cookie product, comprising admixing at least one discrete portion of a cookie dough bakeable to a rigid crumb matrix in contact with at least one discrete portion of a cookie dough bakeable to a soft or plastic crumb matrix having a porosity approximating that of the rigid crumb matrix; wherein the dough bakeable to the soft or plastic crumb matrix is comprised of a flour-based dough including an amount of humectant effective to render said dough bakeable to a product having a moisture content of at least about 6% by weight and a storage-stable soft, moist and plastic crumb matrix, in admixture with a heat-activated ammonium bicarbonate leavening agent which releases at least about 70% of its leavening gas at the stage during baking of the dough at which said dough bakeable to the soft or plastic crumb matrix is capable of maintaining porosity imparted by the leavening agent.

48. The method according to claim 47 wherein said dough bakeable to a soft or plastic crumb matrix is a leavened cookie dough comprised of flour, water, humectant, shortening and sucrose, and wherein the cookie product baked from said preform has a water activity of below about 0.7.

49. The method according to claim 48 wherein the flour-based dough bakeable to said soft or plastic crumb texture includes in combination with the heat-activated leavening agent, a leavening agent comprised of sodium bicarbonate and a leavening acid, and when the preform is baked the pH of the baked product is about 5.5 to about 8.0.

50. The method according to claim 48 wherein the humectant is a sugar selected from the group consisting of fructose, dextrose, corn syrup, high fructose corn syrup, honey, molasses and invert syrup.

51. The method according to claim 48 wherein the humectant is selected from the group consisting of food compatible humectant polyols and humectant starch hydrolyzation products.

* * * * *